Figure 1:
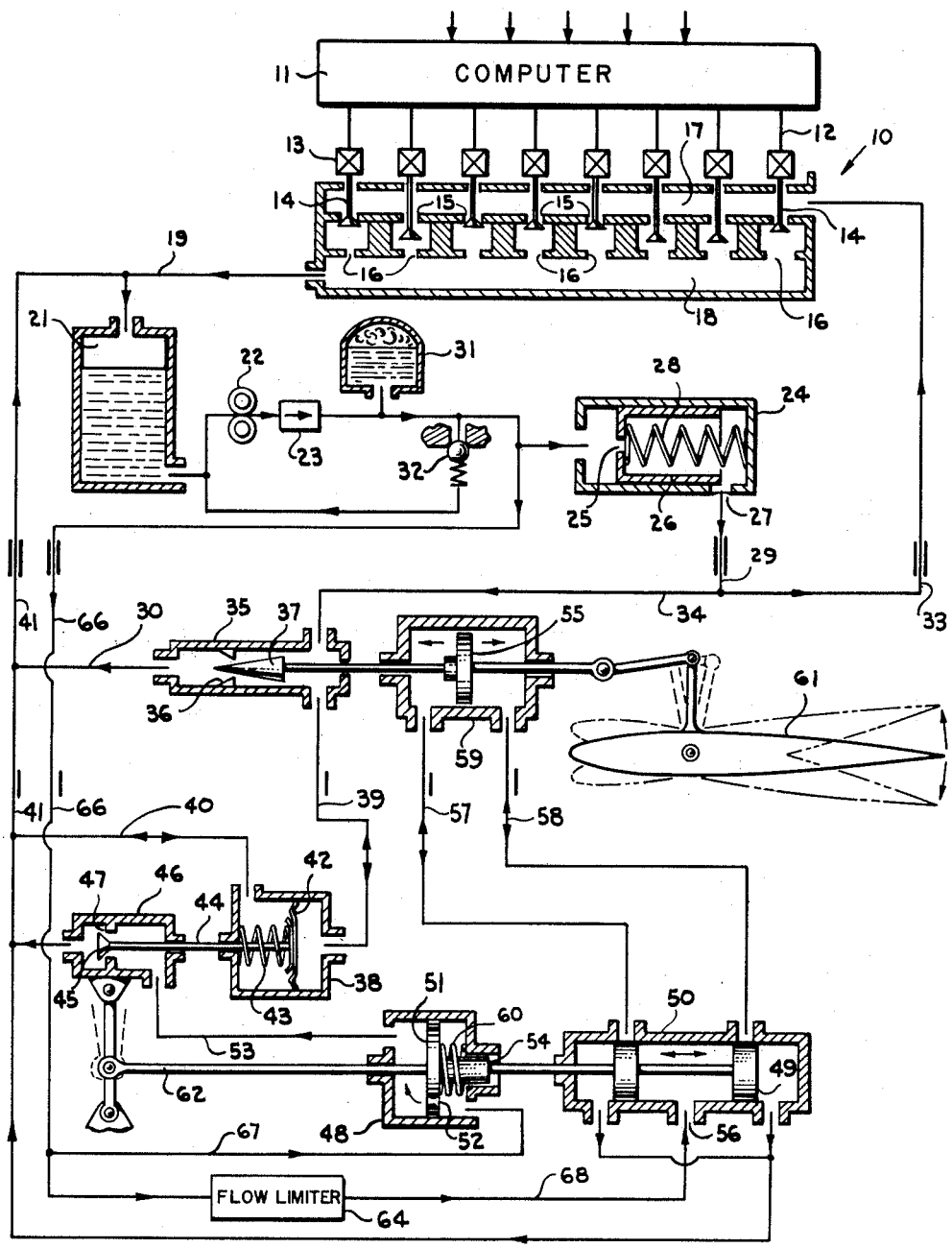

Jan. 5, 1965 W. FRANTZ 3,164,065
INCREMENTAL DIGITAL FLUID ACTUATOR
Filed Dec. 29, 1961 2 Sheets-Sheet 2

INVENTOR.
WILLIAM FRANTZ
BY
Julian C. Renfro
ATTOR.

United States Patent Office 3,164,065
Patented Jan. 5, 1965

3,164,065
INCREMENTAL DIGITAL FLUID ACTUATOR
William Frantz, Winter Park, Fla., assignor to Martin-Marietta Corporation, Middle River, Md., a corporation of Maryland
Filed Dec. 29, 1961, Ser. No. 163,292
16 Claims. (Cl. 91—365)

My invention relates to a digital hydraulic actuator and more particularly to a device having an input arrangement for directly accepting binary output signals from a digital computer, and causing motion to take place in discrete increments in accordance with the computer signals.

Certain prior art devices have been proposed to accept directly a binary input, but these have been comparatively rudimentary devices that are repetitive in nature; either calling for a variety of pre-selected stops, which can impose damaging loads on a structure, or the use of repeated measured slugs of oil. A repetitive system is subject to contamination sensitivity, is potentially damaging unless the structure is made excessively over-strength, and is not capable of demonstrating the same degree of rapidity in going from one position to another. Also, this type of system is usually too slow for large errors and too fast for small errors, and subject to cumulative errors requiring complex resetting procedures.

According to this invention I achieve a direct actuator output in accordance with the input from a digital input device, such as a digital computer, by utilizing a hydraulic system equipped with a number of computer output-operated valves employed for controlling the flow of fluid through a number of orifices sized in binary progression. For example, if eight computer outputs are employed to operate valves, because of the fact that each orifice has an area twice that of the immediately preceding orifice, a total of 255 different areas are involved, with a direct actuator output being obtained in accordance with a selected area.

In addition to employing a servo actuator for moving an output member, the digital to analog conversion portion of my system utilizes two fluid circuits, and means for supplying a constant flow of fluid to these circuits. The orifices representing the computer selected areas are disposed in one of these fluid circuits and a variable area device is disposed in the other. Means are provided for sensing the changes in pressure drop across these restrictions in parallel brought about by computer inputs, and these changes in pressure differential are employed for causing a movement of the variable area device so as to bring about a re-establishment of the original pressure drop. This corrective movement simultaneously brings about a useful output in the form of actuator movement proportional to the amount of change in the computer selected area.

Accordingly, when the digital computer for example brings about an increase in the computer selected areas, there is a subsequent drop in the pressure differential, which is sensed by a servo mechanism arranged to quickly bring about a repositioning of the variable area device to compensate for the increased flow, this being accomplished in such a manner as to reestablish the original pressure differential, as well as to provide at the same time a rapid, useful output.

An important basis for the operation of my invention involves the fact that the sum of the computer controlled areas plus the area of the position sensitive means equals a constant. By design a regulated constant flow of hydraulic fluid is supplied to the binary areas and to the position sensitive area in parallel, and maintained so by the flow regulator. If a constant pressure drop is maintained across these two areas, then there is necessarily a known and fixed relationship at all times between the position sensitive area and the computer selected area. As a result, a change in the computer selected area will in accordance with this invention bring about, by the action of the pressure difference sensor acting to close a servo loop to maintain the sum of the areas constant, the selection of a corresponding actuator position which, within the gain of the hydraulic system, is independent of load.

The operation of my invention is based upon the well-known relationship (1) $$q = C_d A \sqrt{2g \frac{dP}{\rho}}$$

where
$q$ = flow, in cubic ft. per second
$C_d$ = orifice coefficient, dimensionless
$A$ = orifice area, in square feet
$g$ = gravitational constant, ft./sec.$^2$
$dP$ = pressure difference: in lbs. per ft.$^2$
$\rho$ = density of fluid flowing, lbs. per ft.$^3$ Equation 1 above can, of course, be written as (2) $$q = K_1 = K_2 \sqrt{\frac{1}{\rho}}$$

for the flow through the flow regulator, where $K_1$ and $K_2$ are the constants of the flow regulator, including the orifice coefficient. Therefore, Equation 2 also represents the flow supplied to the computer and the positon sensitive areas.

The performance of the complete assembly according to my invention is defined by the relationship (3) $$q = K_2 \sqrt{\frac{1}{\rho}} + C_d [A_{computer} + A_{valve}] 2g \frac{dP}{\rho}$$

where $dP$ in this case is the setting at the $dP$ sensor.
Then $$K_2 \sqrt{\frac{1}{\rho}} = K_3 [A_c + A_v] \frac{dP}{\rho}$$

where $K_3 = C_d \sqrt{2g}$
Significantly, $\rho$ cancels out, making the system independent of density variations.
This can be expressed (4) $$\frac{K_2}{K_3(A_c + A_v)} = \sqrt{dP} = K_4 = \text{constant}$$

If $dP$ is maintained constant in accordance with action of the $dP$ sensor, then it logically follows that $A_c + A_v$ must be a constant, mathematically $$\frac{K_2}{K_3(A_c + A_v)} = K_4$$

then $$\frac{K_2}{K_3 K_4} = A_c + A_v$$

$K_5 = A_{total}$ where $A_c + A_v = A_{total}$

Therefore, for a constant $dP$, the sum total of computer areas plus position sensitive areas is a constant.

It may be helpful to compare my present invention with my Patent No. 3,017,865 entitled "Infinitely Variable Hydraulic Damper and Locking Mechanism," assigned to the assignee of the present invention. Whereas in the present invention the velocity of the actuator is directly proportional to the error, according to the variable rate damper concept, the velocity of the actuator is proportional to the rate of change of error. For example, the variable rate damper maximum actuator velocity will occur for even a small error if it has taken place rapidly, whereas in the present device the actuator velocity is directly proportional to the error itself.

Because the variable rate damper can, if improperly used, degenerate a system response affecting stability and causing oscillation, etc., it was found desirable to make the previous invention sensitive to rate of change of error. The present invention makes the velocity a function of error directly, thus the elimination of the conventional velocity and acceleration feedback signals normally resorted to for achieving stability can be accomplished.

The variable area device may be in the form of a valve having a movable member that is contoured to provide greater sensitivity about the null position and more rapid correction at the extremes. This is a valuable feature which can actually provide the same overall effect on control as now can only be achieved by incorporating velocity and acceleration feedback in a control computer. These computer simplifications can be considerable. Other possible variations in valve design to accommodate different fluids operating at various temperatures will be evident to those familiar with the field.

It is important to note that many modifications may be made within the spirit of my invention in order to suit the needs of a particular application. For example, a half area piston device may be used for moving a servo valve to control the flow of hydraulic fluid to the output actuator, or alternatively this type of device may be employed for directly furnishing the output of the system.

Similarly, the device for sensing the change in pressure drop across the restrictions of the fluid lines may be employed for controlling a pilot flow of fluid through the half area piston device, or for directly moving the servo valve controlling the flow of fluid to the actuator. In some extreme instances this pressure differential measuring device may even be employed for directly furnishing the output of the system.

Figure 2:
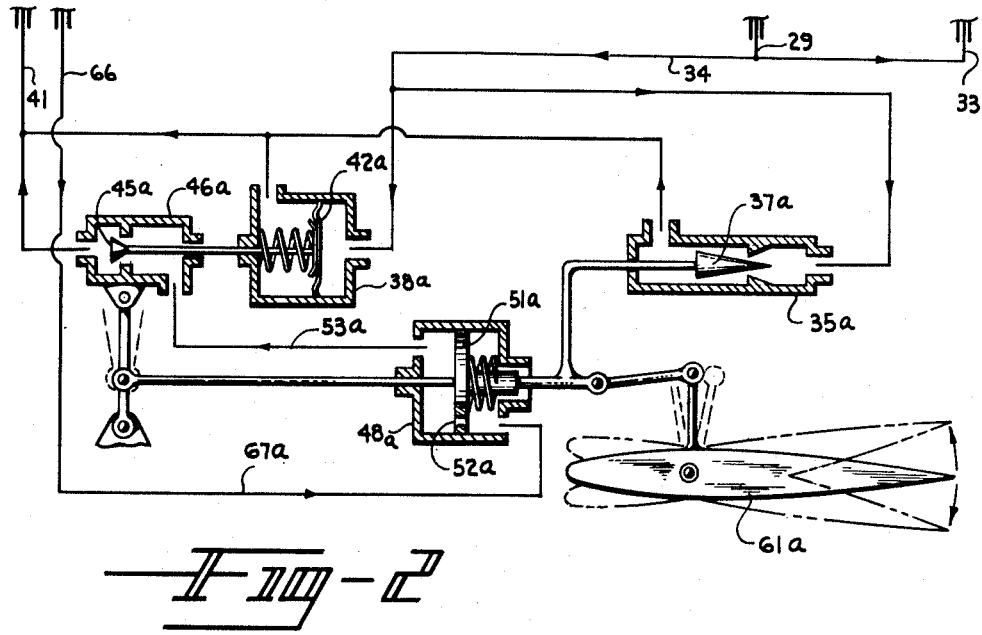
Figure 3:
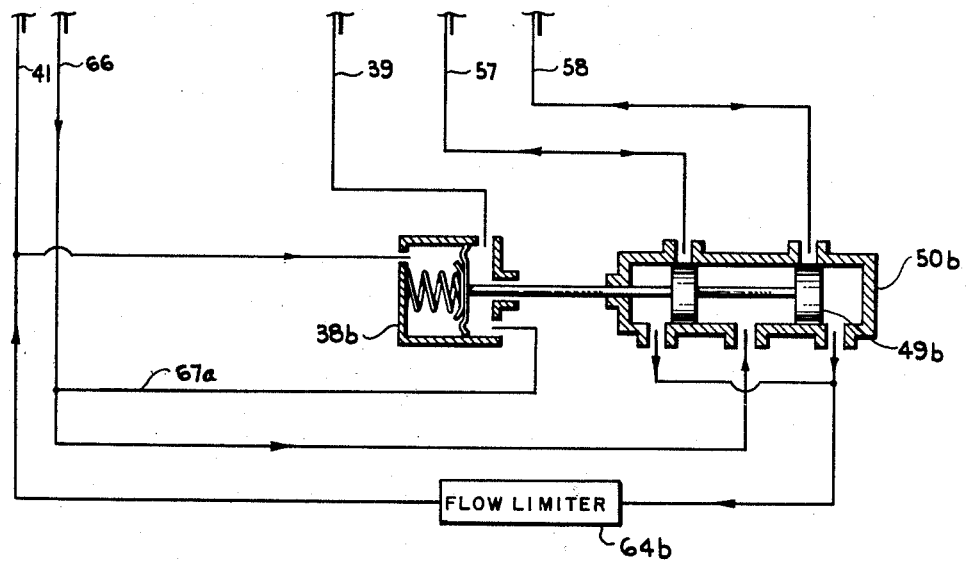

These and other objects, features, and advantages of my invention will be more apparent from a study of the appended drawings in which:

FIGURE 1 is an overall schematic drawing of a system according to my invention, adapted to provide an output of considerable power to meet large loads moving at a rapid rate;

FIGURE 2 is a simplified version of the lower portion of the system illustrated in FIGURE 1, being adapted for lower power requirements but still capable of operating with fluid that may have a high degree of contamination; and FIGURE 3 is a view similar to FIGURE 2 in that it is used with the upper portion of FIGURE 1, but is simplified in that the $dP$ sensor operates the spool valve directly in a system requiring contamination-free fluid, but nevertheless capable of meeting higher power output requirements than the device according to FIGURE 2.

Referring first to FIGURE 1, a system according to my invention is there revealed which includes a buffer 10 arranged to receive the electrical outputs from a computer 11, the buffer serving to convert digital signals to analog. Computer 11 is a digital computer having a number of outputs 12, in this instance the outputs being in the form of eight electrical signals. A solenoid 13 is provided for each computer output, and each of the solenoids in turn is connected to a valve 14 that cooperates with a valve seat 15, thus controlling the flow of fluid through a respective orifice 16. The orifices 16 are sized in binary fashion, which means in effect that each successive orifice is twice as large in area as the preceding orifice as viewed from left to right in the figure. The areas of orifices 16 therefore open in response to computer outputs, and are hereinafter referred to as the computer selected areas.

The buffer 10 is equipped with an inlet manifold 17 to receive hydraulic fluid from a fluid source, and an outlet or return manifold 18 into which flows the fluid leaving the orifices 16. Fluid connection 19 connects the output of the return manifold 18 to a reservoir 21.

The means for supplying hydraulic fluid to my system is not limited to any particular type of pump, and for convenience I have indicated a gear pump 22. The pump for example obtains its input from the bottom part of reservoir 21, with the output of pump 22 flowing through a check valve 23 and thence through appropriate hydraulic lines or connections to a flow regulator 24 that establishes a preselected constant rate of fluid flow to the system. Flow regulator 24 has a fixed orifice 25, with the pressure drop across this orifice following the square law relationship. Therefore, as the quantity of flow through orifice 25 would tend to increase, the inner body 26 of the flow regulator tends to move so as to restrict the fluid flow through orifice 27 into the system. Conversely, as the quantity of flow through orifice 25 would tend to decrease, spring 28 tends to force an inner body 26 to the left as viewed in the figure, thus decreasing the restriction at orifice 27 and thus allowing a constant amount of fluid to flow into the system. Flow regulator 24 does not per se form any part of my invention and may be a device of the type furnished by Waterman Engineering Company of Evanston, Illinois, or United Aircraft Products of Dayton, Ohio.

In accordance with standard hydraulic practices I may use an accumulator 31 that functions to take the surges out of the system and also serves to store oil to meet peak load requirements. Relief valve 32 is provided to establish a limit pressure delivered to the system.

The flow from the outlet line 29 of the flow regulator divides, with part flowing into line 33 connected to the inlet manifold 17 of the computer selected areas and the remainder flowing through fluid line 34 and thence through position sensitive valve 35. The fluid leaving valve 35 then flows via fluid line 30 to return line 41. The hydraulic fluid flowing through valve 35 flows through an internal orifice 36 whose area is controlled by a longitudinally movable member 37 that is shaped to cooperate with orifice 36 to meet the position increments as required in order to balance the system. In other words, the member 37 is moved so that the area of orifice 36 plus the computer selected areas will be a constant.

The valve 35 serves the function of generating varying resistances to the constant rate of flow occurring through flow regulator 24 in such a manner as to reflect actuator position. This entails the use of a differential pressure sensor 38, hereinafter referred to as $dP$ sensor, which serves to measure the location of the actuator by sensing the pressure difference across the valve 35. The latter is accomplished by virtue of the fact that a sensing line 39 is provided between the inlet of sensor 38 and valve 35.

In other words, $dP$ sensor 38 senses the pressure existing at the inlet to the position sensitive valve 35 and at the inlet to the computer selected areas 16, and compares this pressure, by means of line 40, with the downstream pressure existing in return line 41. For sea level operation it is unnecessary to compare the pressure at the aforementioned areas with return line pressure, but inasmuch as my invention may be used in environments involving varying altitude, by constructing the $dP$ sensor to compare these pressures, the effects of ambient pressure variations as well as variations in supply system pressure can be cancelled.

Diaphragm 42 of sensor 38 is arranged to sense any change in the pressure difference appearing either in the position sensitive valve or in the computer selected areas. This diaphragm is biased by a spring 43 which establishes a metering pressure difference across orifice 36, and this pressure difference is by design, definition, and intent the same as the pressure difference across the computer selected areas. The constant pressure difference is achieved by having spring 43 factory set to a load or length corresponding to a pre-established pressure difference, and this setting of the spring need not be altered with altitude or back pressure change. The motions of diaphragm 42 are sensed by rod 44 which, in turn, controls the position of poppet valve 45 of a pilot valve 46. Poppet valve 45 cooperates with a valve seat 47, and the amount of flow taking place through this device establishes the position of the half area piston device 48 hereinafter discussed, which is connected to operate the movable portion of servo valve 50.

According to this invention a command signal as established by the computer 11 is manifested to this system as a change in pressure drop, which is a function of the computer selected areas. Because the sensor 38 is sensing the change of pressure, it can be used and is used to control the position of the actuator piston 55 so as to maintain by a mechanical connection from the actuator to the valve 35 the constant pressure drop across both computer selected areas and valve 35.

The foregoing is predicated upon the fact that a constant pressure drop coupled with a constant flow by definition results in a constant area. Because for every combination of computer selected areas there is a known and predictable position for the actuator, this means that for every digital binary input from the computer there is a precise predictable actuator output.

As should therefore appear obvious, the valve 35 is an important part of my invention, and it should be noted that the accuracy desired in certain operative bands of my invention can be controlled and obtained by contouring the member 37 to meet the specific positioning requirement. For example, the steeper the slope of the contoured member 37 the smaller need by the movement of the actuator, for larger area changes occur for smaller increments of travel of a sharply contoured body 37. Conversely, large servo movements can be accommodated in the valve 35 by the use of a less steeply contoured member 37.

Half area piston device 48 is a well known device which may be utilized according to my invention as a servo actuator or power amplifying means. In FIGURE 1 it may be employed for moving the spool valve member 49 of servo valve 50 so as to bring about motion of piston 55 of hydraulic actuator 59, and to restore by movements of valve 35 the pressure difference that occurs frequently during the operation of my system as a result of changes in the computer-selected area. In other words, as the computer-selected area changes as a result of different computer inputs, this brings about a pressure difference sensed by differential pressure sensor 38. The ensuing motions of the diaphragm 42 of this device brings about either a closing of valve 45 or else a further opening thereof, resulting in pressure differences manifested in line 53 that is connected to half area piston device 48.

Half area piston device 48 is connected with its smaller right hand face exposed to line pressure as delivered by fluid line 67, which is connected to pressure line 66 which in turn is connected to pump 22. The right hand face may for example have an area of two square inches. Pressure dropping orifice 52 is disposed in piston 51, and this orifice allows a continuous flow from the right hand side of this device into the left hand side of the device, where the lessened fluid pressure can manifest itself against the larger left hand face of piston 51, which, in this instance, has an area of about four square inches.

As a further example, the line pressure may be 3,000 lbs. per sq. in. which is constantly manifested against the right hand face of piston 51, this face being smaller because of a piston-like member 54 centrally disposed on the right hand face of piston 51.

As a result of flowing through orifice 52, the like pressure is dropped considerably, and when this reduced pressure is manifested against the left hand face, the resulting force will balance the 6,000 lbs. force asserted against the right hand face as a result of the line pressure acting against the two square inch area of right hand face, plus the load of spring 60.

As a feature of design consequence, spring 60 may be sized in accordance with the inertia of the spool valve 49, and that of other elements to which the piston 51 may be connected, such as the rod 62 and pilot valve housing 46, this being done in such a manner as to prevent oscillation of this system under operating conditions. Consequently, the force of spring 60 will considerably affect the sizing of orifice 52, for as previously indicated, the piston 51 must be in equilibrium under operating conditions, and orifice 52 of course directly determined the pressure manifested on the left face of 51, which amounts to a force that must be balanced by the spring 60 and the line pressure against the smaller right hand face of piston 51.

The spool valve 49 is moved in the housing of servo valve 50 as a result of movement of half area piston 51 away from its equilibrium point. These movements of spool valve 49 will result in the system pressure supplied by line 68 to inlet orifice 56 of the valve housing being delivered either to line 57 or to line 58, which lines are connected to opposite ends of actuator house 59. For example, if the spool valve 49 moves to the right, system pressure can manifest itself in line 58 and drives actuator piston 55 to the left so as to cause control surface 61 to pivot counter clockwise, resulting in the trailing edge of the surface rising.

As the piston 51 is moving to alter the spool valve position, it also operates by means of connecting rod 62 the pilot valve housing 46 so as to serve a feedback function. The use of the feedback arrangement may not always be necessary but has been illustrated in the primary embodiment of this invention inasmuch as this type of arrangement may be required in some utilizations for stability reasons.

Flow limiter 64 is provided in the supply line to the spool valve to establish a maximum control surface slewing rate for those instances in which it is necessary.

As an example of the operation of my device, assume that the computer has altered an equilibrium condition by increasing the area of orifice 16, flow regulator 24 will adjust itself to maintain the flow at its preselected constant value. The net result will be a decrease in the pressure difference required to force this constant flow through the combined computer areas and position sensitive areas. This is because the same flow will now be going through a larger area, therefore the resistance will be less. The pressure differential sensor 38 will sense this reduced pressure difference and move to the right, closing off the effective opening at the poppet valve 46. The result of the seating of valve member 45 of this action will be to stop the flow through restriction 52 in the half area piston 48, causing pressure on both sides of the piston to be the same or at system supplied pressure. The half area piston, by virtue of the double area on the left hand side will cause the piston and spool valve 49 to move to the right, thus porting hydraulic pressure to the right hand side of the actuator 59, in turn causing the actuator piston to move to the left, resulting in control surface movement, and the moving of member 37 to reduce the area at the position sensitive arrangement. The valve member 37 will keep moving until the pressure drop is restored to its previous value at which time the pressure differential sensor will go back to its null position causing the half area piston to return, under the influence of spring 60, to the location in which valve member 49 is in its shut off position. The feedback linkage 62 works off the action of the half area piston and acts to move the sleeve or housing 46 to establish a degree of proportionality between the motion of the half area piston (and therefore the spool valve) with the magnitude of the pressure differential sensor. As noted before, this feedback is utilized to assure stability, but in many instances this will not be necessary.

It will be observed that the area at the position sensitive valve plus the total of the areas selected by the computer will always remain a constant, and it is this fact which enables one to predict and control the actuator position in accordance with the computer selected input.

It can be observed that a reduction in the computer selected areas will temporarily result in a reduced flow which will be immediately corrected by the flow regulator, thus establishing a greater pressure difference across the sets of areas. The pressure differential sensor will then move to the left, opening the poppet valve 45 reducing the pressure on the downstream side of the half area piston causing it to move to the left. This action will port system pressure to the left hand side of the actuator 55 which in turn will move to the right, opening the area at the position sensitive valve 35. The actuator and its position sensitive valve will keep moving until the pressure difference is restored to its equilibrium, at which point the sum total of areas will once more become a constant.

Although for reasons such as self-cleaning and inexpensiveness I prefer the use of a poppet type valve 46, it is nevertheless within the spirit of my invention to utilize a conventional landed servo valve in its stead, in which event an ordinary piston and cylinder arrangement can be utilized in lieu of the half area piston device 48. While the system incorporating the landed valve and ordinary piston is potentially more expensive, less rugged, and more subject to vibration effects, it has the distinct advantage of the fact that no pilot flow will be required in the null position of the valve in the nature of the pilot flow necessarily taking place through line 53 at all times. The use of a feedback arrangement is not affected by this modification of FIGURE 1, for the motion of the piston controlling the servo valve is transmitted as before to reset the valve to prevent oscillation.

As will be apparent to those skilled in the art, the embodiment according to FIGURE 1 may use an entirely separate fluid pressure arrangement in connection with the spool valve and the servo piston. Because this embodiment utilizes in effect an independent fluid system as the "muscles" of the system, such an embodiment is adapted for use in the most severe operating circumstances.

In the event that the energy requirements are less than the arrangement shown in FIGURE 1, an embodiment along the line of that revealed in FIGURE 2 or 3 may be used. As will be apparent, FIGURE 2 represents an embodiment that could be attached to fluid lines 41, 66, 29, and 33 of FIGURE 1, with servo actuator 59 and servo valve 50 being eliminated. The upper portion of FIGURE 1 is utilized in conjunction with FIGURE 2 in the same manner as with FIGURE 1, with it being understood that the double dark lines shown at the mid portion of FIGURE 1 indicate the locations at which the fluid lines 41, 66, 29 and 33 would be connected to the lines located at the upper portion of FIGURE 2 in the event that the embodiment of FIGURE 2 is to be employed. Sensor 38a is employed as before to read the change in pressure drop appearing across the two orifices in parallel, and the motions of the diaphragm 42a of this sensor brings about as before appropriate movements of poppet valve 45a. This embodiment differs, however, in that the half area piston device 48a becomes in effect the servo actuator and directly brings about movements of the load herein represented by airfoil surface 61a.

The position sensitive contoured valve 35a operates as before to read out the position of the airfoil surface and thereby generating a pressure drop that accurately reflects the position of the actuator or load, for as mentioned in connection with the embodiment of FIGURE 1, the area of device 35 and the computer controlled areas must always equal a constant. Movements of contoured valve member 37a are brought about by the use of a mechanical feedback linkage.

Half area piston device may be supplied through line 67a with system pressure, such as at 3,000 lbs. per square inch. Dropping orifice 52a allows a flow of system pressure to take place through piston 51a and thence through line 53a to pilot valve 46a, and thence past valve member 45a back to return line 41.

In the event dP sensor 38a of FIGURE 2 brings about a closing of valve 45a, as a result of a change in load or a new signal, this brings about a cessation in flow through line 53a and therefore allows full system pressure to build up in the left hand side of the half area piston chamber. Full system pressure on this, the larger side of piston 51a, brings about a substantial amount of force to bring about desired movements of the load, thus eliminating the use of the comparatively expensive spool valve.

However, this arrangement is not without its penalty, for inasmuch as all of the fluid flow responsible for bringing about changes in position of the load must flow through the pilot valve, this arrangement is limited to small flows and therefore slow corrective movements. The requirement of small flow is brought about as will be apparent to those skilled in this art by the fact that the dP sensor 38a can only do a limited amount of work, and therefore this places a limiting size upon the pilot valve controlled thereby.

FIGURE 3 represents another embodiment of my invention, which amounts to a simplified scheme in which the dP sensor 38b is utilized directly to move the spool valve 49b. This embodiment, like FIGURE 1, may utilize a separate fluid system and therefore can control heavier loads than was possible in the immediately preceding embodiment. Furthermore, the half area piston and its accompanying expense are eliminated. This embodiment is of course connected by lines 41, 66, 39, 57 and 58 to the portion of FIGURE 1 at the locations indicated by the single dark lines in FIGURE 1.

This simplification, however, is not without its accompanying disadvantages, these being that the dP sensor, unlike the half area piston, cannot because of its sensitive nature control the spool valve members under adverse operating conditions.

Instances in which the embodiment of FIGURE 3 would not be entirely satisfactory would be those in which a high rate of flow through the servo valve is required, which would of course be a requirement in large installations, where large loads are being moved rapidly and hence large flow rates required. Another instance is that in which contamination is likely to occur, which well may result in increased difficulty of movements of the spool valve member with respect to its housing. For the instance in which a powerful device such as a half area piston is being employed, this latter fact is of comparatively small consequence, whereas contamination in the embodiment shown in FIGURE 3 may well prove to be too large an opposing force for the dP sensor 38b effectively to handle.

As will be apparent in FIGURE 3, the flow limiter 64b may be disposed in the return line from the servo valve, this serving as in the previous instance to establish a ceiling to prevent the load from slewing too rapidly.

For one exemplary embodiment of my invention, four inputs capable of 16 discrete steps were used. The pilot flow was set at 0.5 g.p.m. at a nominal setting of 55.5 p.s.i. at the dP sensor. Hysteresis curves showed that the actuator went to the same position within less than .001 inch for most points, with the maximum excursion never exceeding .02", for the worst case with an actuator total stroke of 1¼". Transient response test as run on a recorder gave a time constant of 0.1 second or better, and with no overshoot in the descending bit (computer) regime, and only one overshoot before settling out in the descending bit (computer) regime.

Typical hysteresis data is tabulated below in terms of stroke in inches for a representative valve contour.

| Bits | Ascending | Descending | Ascending | Descending |
|---|---|---|---|---|
| 3 | .970 | .996 | .963 | .962 |
| 4 | .922 | .917 | .901 | .915 |
| 5 | .850 | .830 | .846 | .848 |
| 6 | .795 | .788 | .788 | .788 |
| 7 | .744 | .745 | .743 | .727 |
| 8 | .712 | .711 | .698 | .709 |
| 9 | .670 | .669 | .668 | .666 |
| 10 | .633 | .632 | .630 | .632 |
| 11 | .602 | .600 | .598 | .600 |
| 12 | .571 | .574 | .566 | .573 |
| 13 | .554 | .543 | .543 | .539 |

This data when plotted results in a curve particularly suited for its application, and illustrating the ability of the system to consistently achieve any desired variation of actuator stroke with the area bit selected.

As will be apparent to those skilled in this art, I have endeavored to show a primary version of my invention as well as alternative arrangements of certain significant portions. It should be realized that although my invention was designed primarily for use with an electrical digital computer, my invention is not limited to use with such a device, for it can be effectively operated with manually operated valves, pneumatically operated shut-off valves, and solenoid valves operating on a taped program.

The very precise operating features of this invention make it admirably suited for tool positioning, work positioning, and memory access devices. In each of these instances the accuracy of the output independent of load is the prime consideration.

Various other modifications within the spirit of my invention will be obvious to those skilled in the art, and the illustrated embodiments described at length herein are not to be regarded as limiting, except as required by the scope of the appended claims.

I claim:

1. A digital input hydraulic actuator system comprising a circuit having two fluid paths, each having a variable area restriction therein, and a relatively incompressible fluid adapted to flow through said fluid paths, one of said fluid paths having a plurality of orifices therein sized in binary fashion, means for selecting the total orifice area through which fluid may flow, thus to establish an input command to the system by changing the quantity of flow through said one fluid path, the other of said fluid paths having an orifice area which varies inversely as the effective area in said one fluid path so that the sum of the areas of the restrictions of the two fluid paths remains constant, means for supplying a constant regulated flow of relatively incompressible fluid to flow in parallel through said fluid paths and therefore through said rectrictions, means for sensing the pressure difference across said two restrictions in parallel, and means for altering the restriction in said second fluid path so as to maintain constant said pressure difference, while at the same time producing a commensurate output motion.

2. The hydraulic actuator arrangement as defined in claim 1 wherein said pressure difference sensing means operates through a power amplification system to bring about movement of a servo valve, said servo valve controlling the flow of servo fluid to an actuator to bring about the output motion.

3. The hydraulic actuator arrangement as defined in claim 1 in which said pressure difference sensing means operates through a power amplification system connected to directly bring about the output motion.

4. The hydraulic actuator arrangement as defined in claim 1 in which the pressure difference sensing means directly moves a servo valve controlling the flow of servo fluid to an actuator supplying the output motion.

5. The hydraulic actuator arrangement as defined in claim 1 in which said pressure difference sensing means represents the output motion of the arrangement.

6. The hydraulic actuator system as defined in claim 1 in which said means for altering the restriction in said second fluid path comprises a hydraulic power amplification system to control the motion of a servo valve, said power amplification system incorporating a mechanical feedback arrangement to prevent oscillation.

7. The haydraulic actuator system as defined in claim 1 in which said means for altering the restriction in said second fluid path utilizes a half area piston device for bringing about actuator output motion as well as motion of a variable area valve utilized in said second fluid path for controlling the restriction therein, and a feedback arrangement interconnected with said half area piston, said feedback arrangement being interrelated with said pressure difference sensing means and being effective to prevent oscillation of said actuator.

8. The hydraulic actuator system as defined in claim 1 in which said means for altering the restriction of the second fluid path includes a half area piston device for moving a servo valve to control the flow of hydraulic fluid to an output actuator, a pilot flow of fluid at supply pressure arranged to flow through a fixed restriction in said half area piston device, said pilot flow also flowing through a pilot valve utilizing a valve and valve seat arrangement, said pressure difference sensing means having a motion resulting from pressure difference sensed, said motion establishing the effective area of the pilot valve at its seat, changes in effective area altering the quantity of flow through said fixed restriction and pilot valve, the latter flow determining the pressure effective to act against said half area piston device and hence determines its position, the position of said half area device being proportional to the pilot valve motion through a feedback linkage for moving said valve seat, said feedback linkage making the servo valve motion proportional to the change in sensed pressure difference to insure proportionality of correction as required for stability considerations.

9. In a digital hydraulic actuator system utilizing a circuit having at least two fluid paths and a relatively incompressible hydraulic fluid adapted to flow therein, a servo actuator for moving an output member and having an infinitely variable number of output positions, means for supplying a constant flow of hydraulic fluid through said two fluid paths of such system, one of said hydraulic fluid paths having therein a restriction in the form of a plurality of orifices sized in binary fashion, the areas of which are controlled by a digital type input device, the other path having a variable restriction whose area is a function of the particular output position of said actuator, means for sensing changes in pressure drop associated with the constant flow of hydraulic fluid through both of said restrictions in parallel, such changes in pressure drop resulting from changes in digital inputs, means for varying the area of said variable restriction in accordance with pressure drop by modulating the flow of hydraulic fluid to said actuator to control actuator position and thereby maintain constant the pressure drop sensed by said sensing means, said actuator being arranged to alter the area of said variable restriction in an inverse manner to the changing areas of the digital input selected orifices so that the total area subject to the regulated flow remains constant, whereby a predictable output position of said actuator can be achieved for each computer selected area.

10. The actuator system as defined in claim 9 in which said servo actuator utilizes pressure fluid from a separate source than the fluid flowing through said restrictions.

11. The actuator system as defined in claim 9 in which a half area piston device is employed for bringing about movements of said output member, said half-area piston device accomplishing such movements in response to the changes in pressure drop sensed by said means for sensing changes in pressure drop.

12. The actuator system as defined in claim 11 in which said half area piston device acts directly to bring about output movement.

13. The actuator system as defined in claim 11 in which said half area piston device acts to move a flow controlling valve which establishes the velocity and direction of actuator motion.

14. The actuator system as defined in claim 9 in which said sensing means is a device having a mechanical output that directly controls a servo valve, said servo valve controlling the flow of hydraulic fluid to said actuator.

15. A digital hydraulic system comprising a circuit having at least two fluid paths and a relatively incompressible hydraulic fluid adapted to flow therein, one of said paths having a restriction therein in the form of a plurality of orifices sized in binary fashion, whose areas are controlled by a digital type input device, the other path having a variable restriction whose area can be controlled so as to keep the total area of the restrictions in the two paths a constant, means for causing a constant flow of hydraulic fluid through said paths in parallel, means for sensing a change in pressure drop across said restrictions in parallel, means for varying the area of said variable restriction to restore said pressure drop, latter means simultaneously providing an actuator whereby a predictable output position of said actuator can be obtained for each selected input area.

16. In an actuator system utilizing a relatively incompressible hydraulic fluid, said system comprising a hydraulic actuator for moving an output member in response to flow of a servo fluid and having an infinitely variable number of output positions, means for supplying a constant flow of hydraulic fluid through at least two fluid paths of said system, one of said hydraulic fluid paths having therein a first restriction in the form of a plurality of orifices sized in binary fashion, whose areas are controlled by a digital computer, the other path having a second restriction whose area is a function of the particular output position of said actuator, means for sensing the pressure drop resulting from the constant flow of hydraulic fluid across both of said restrictions in parallel, means for varying the area of said second restriction by controlling the flow of servo fluid to said actuator to maintain constant the pressure drop sensed by said sensing means, said actuator being arranged to change the area of said second restriction inversely to changes in the area of the computer-selected first restriction so that the total area subject to the regulated flow is also a constant, whereby a predictable output position of said actuator can be achieved for each computer selected area.

References Cited by the Examiner

UNITED STATES PATENTS

| | | | |
|---|---|---|---|
| 1,512,804 | 10/24 | Roucka | 91—47 X |
| 2,251,729 | 8/41 | Bach | 121—41 |
| 2,424,304 | 7/47 | Cunningham | 91—48 X |
| 2,443,891 | 6/48 | Buerschaper | 91—47 X |
| 2,649,714 | 8/53 | Griffith | 137—85 X |
| 2,744,502 | 5/56 | Frantz | 91—49 |
| 2,972,999 | 2/61 | Hayner | 137—85 |
| 2,999,482 | 9/61 | Bower | 121—38 |
| 3,058,450 | 10/62 | Lissau | 91—385 X |

FOREIGN PATENTS 423,676    1/26    Germany.

FRED E. ENGELTHALER, *Primary Examiner.*

KARL J. ALBRECHT, *Examiner.*